Nov. 22, 1960   J. W. HUNTER ET AL   2,961,124
COMBINATION INSULATED RECEPTACLE AND COASTER DEVICE
Filed Sept. 25, 1958   2 Sheets-Sheet 1
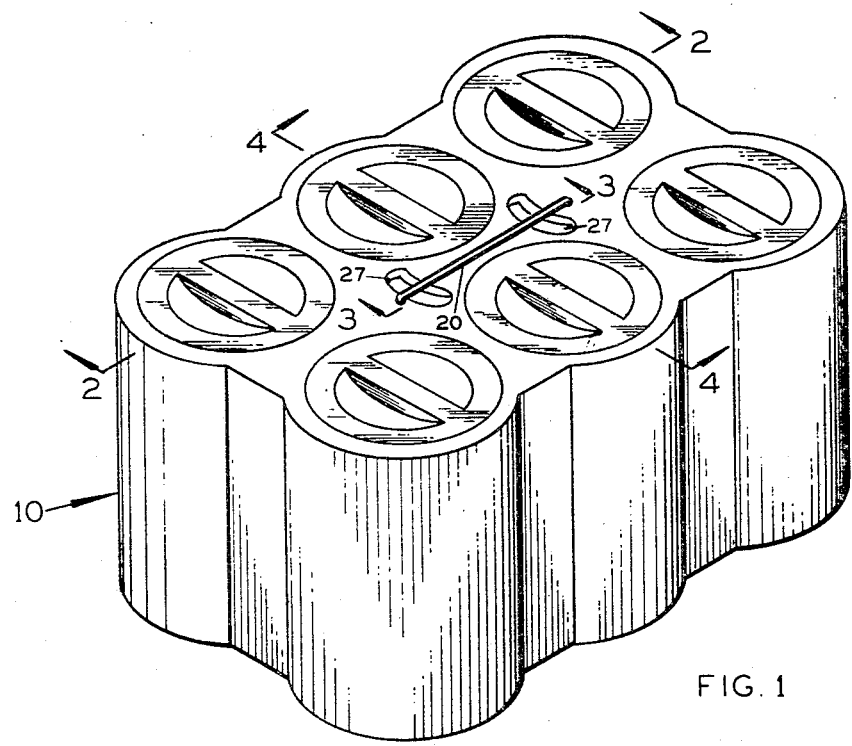
FIG. 1
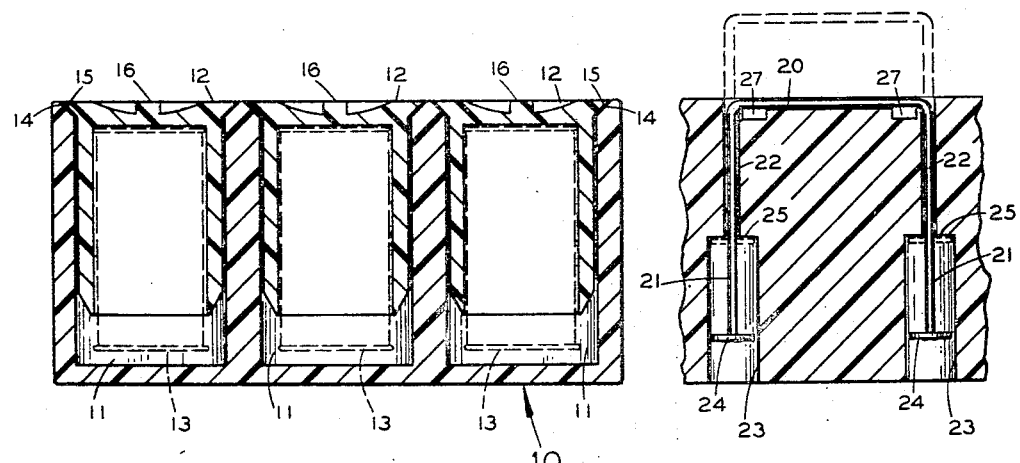
FIG. 2
FIG. 3
INVENTORS
JOSEPH W. HUNTER
STEVE FODOR JR.
BY
Salvatore H. Militana
ATTORNEY

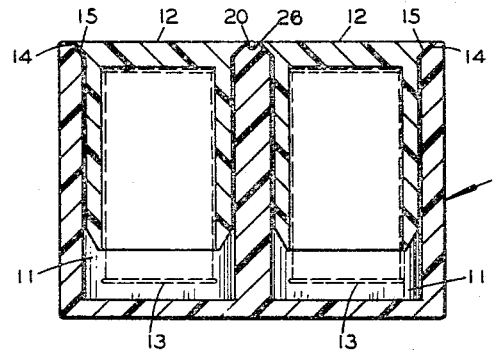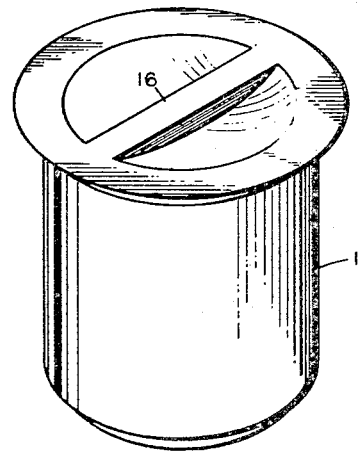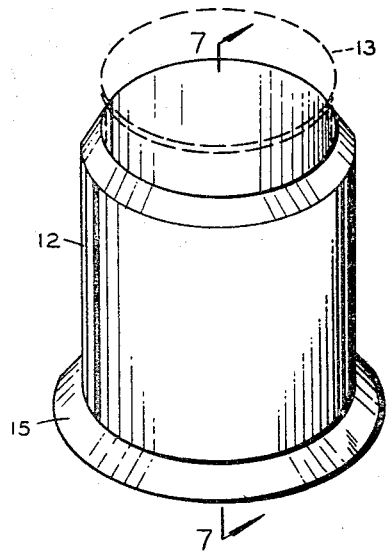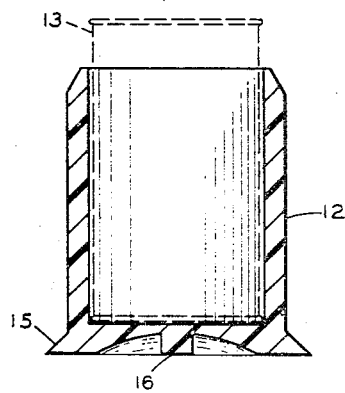

United States Patent Office 2,961,124
Patented Nov. 22, 1960

2,961,124

COMBINATION INSULATED RECEPTACLE AND COASTER DEVICE

Joseph W. Hunter, 3201 SW. 96th Ave., and Steve Fodor, Jr., 8371 NE. 2nd Court, both of Miami, Fla.

Filed Sept. 25, 1958, Ser. No. 763,214

4 Claims. (Cl. 220—104)

This invention relates to insulated containers and is more particularly directed to a combination insulated receptacle and coaster device.

The invention contemplates providing a receptacle made of expandable polystyrene for insulation purposes with a plurality of openings therein for receiving as articles as beverages and the like to maintain at a certain desired temperature and for carrying said beverages by means of a handle mounted thereon. Each of the openings are provided with a cover which also becomes useful as a coaster when the beverage is removed from the container.

Therefore a principal object of the present invention is to provide a receptacle made of expandable polystyrene or the like which furnishes the device with exceedingly high insulation qualities against hot and cold temperatures.

Another object of the present invention is to provide a receptacle with a plurality of openings with covers thereon, which receive one end of the article so that the covers act as coasters and as insulators for the articles when removed from the receptacle.

A further object of the present invention is to provide a coaster for a can or bottle of beverage and the like which coaster serves as a cover for the beverage when placed in a receptacle for storing purposes and which envelopes the greater surface of the beverage to reduce to a minimum the loss of heat or cold when removed from the receptacle.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a perspective drawing of a combination receptacle and coaster device constructed in accordance with our invention.

Figure 2 is a longitudinal cross-sectional view taken along the line 2—2 of Figure 1.

Figure 3 is a fragmentary cross-sectional view taken along the line 3—3 of Figure 1.

Figure 4 is a transverse cross-sectional view taken along the line 4—4 of Figure 1.

Figure 5 is a perspective view of a coaster as shown removed from its position in the receptacle.

Figure 6 is a similar view showing the coaster inverted to permit its use as a coaster and the can of beverage shown in dotted lines.

Figure 7 is a cross-sectional view taken along the line 7—7 of Figure 6.

Referring to the drawings wherein like numerals are used to designate similar parts throughout the several views, the numeral 10 refers generally to our combination receptacle and coaster device constructed of material having good insulation qualities such as expandable polystyrene although any other suitable materials may be utilized in the fabrication of the receptacle 10. The receptacle 10 is provided with six openings or cavities 11 for receiving and containing six bottles or cans of beverage. Obviously, the receptacle 10 can be constructed to contain any desired number of containers of beverages, but it was found that the receptacle 10 as shown is compact and most convenient to handle.

The openings 11 are each shaped and sized to receive in a convenient and snug manner, a combination cover and coaster device 12 in which is positioned a can of beverage 13. In order that the combination cover and coasters 12 fit snugly within the openings 11 to minimize loss of heat or cold as the case may be, the outside diameter of the device 12 is slightly smaller than the inside diameter of the openings 11. Also, at the top portion of the openings 11 a beveled seat 14 is formed upon which an outwardly flared matching rim portion 15 formed at the cover portion of the device 12 is seated. A ridged portion 16 is formed on the top of each of the coasters 12 to permit grasping the coaster 12 in removing the coaster 12 from the opening 11 in the receptacle 10.

Within the coaster 12 may be placed the article desired to be kept at a constant temperature, whether it be heat or cold. As shown for illustrative purposes, the inner wall of the coaster device 12 is cylindrical and of uniform diameter to receive a can of beverage 13. The can 13 fits sufficiently frictionally tight within the coaster device 12 to require a little effort to remove the can or place it in the coaster device 12 as well as the can 12 remaining in position within the coaster device 12 when the latter is placed in the opening 11 of the receptacle 10 and the can 13 hangs in spaced relation to the bottom wall of the receptacle 10 in order that cans of various lengths may be accommodated herein.

Means are provided for carrying the receptacle 10 comprising a handle 20 mounted along the longitudinal axis of the receptacle 10, at approximately its mid-portion. The handle 20 is U-shaped having leg portions 21 which extend through bores 22 and 23 in the receptacle 10. Bores 23 which are larger in diameter than bores 22 (see Figure 3) receive the ends of the leg portions 21 at which position a disk or washer 24 is secured. The juncture of the openings 22 and 23 form a shoulder 25 against which the disk 24 abuts when the handle 20 is grasped and pulled outwardly until it reaches a certain distance from the top of the receptacle. With the handle 20 in its upward position as shown by dotted lines in Figure 3, the receptacle 10 may be readily carried by a person. In alignment with the handle 20 there is a groove 26 in the top surface of the receptacle 10 that receives the handle 20 when the latter is pushed downwardly out of use, the handle 20 will not interfere with the proper stacking of the receptacles 10 one upon the other. To permit grasping the handle 20 by the fingers when in its housed or inoperative position, a pair of arcuate or tapered slots 27 are formed beneath and transversely to the handle 20.

In the normal use of the receptacle 10, cans of beverages 13 are first chilled or heated as the case may be and then placed into the coaster devices 12. Then the coasters 12 are inverted and placed into the openings 11 of the receptacle 10, the coasters 12 being pushed downwardly therein until the top portion is flush with the top of the receptacle 10. A person then inserts his fingers into the slots 27 thereby permitting him to grasp the handle 20 which he pulls upwardly until the handle 20 reaches its top most position. The receptacle 10 can hen be carried. When it is desired to avail oneself of the beverage in the cans 13, a person will grasp the ridge 16 and pull upwardly on the coaster device 12 until he withdraws the coaster 12 and can 13 from the receptacle 10. He then inverts the coaster 12 and either removes the can 13 or punches holes in the top of the can 13 and proceeds to drink therefrom, the coaster 12 being held in the grasp of the person drinking the beverage.

It is readily noted by the construction of our receptacle 10 that the temperature of the beverage or whatever is stored in the openings 11 will remain substantially constant over a considerable period of time. Also, the cover device 12 when placed in position on the receptacle 10 acts as an insulator as does the walls of the receptacle 10 and when removed from the receptacle 10 continues to act as an insulator against heat or cold loss but also becomes a coaster for the can of beverage 13.

Having described our invention, what we claim as new is:

1. An insulated receptacle and coaster device comprising a main body portion having a plurality of substantially vertically disposed cavities, a cover member removably positioned over each of said cavities for sealing said cavities, said cover member having depending side wall portions extending to adjacent a bottom wall of said cavity for receiving an article and insulating said article while in said cavity, handle means mounted on each of said cover members for removing said covers with said articles from said cavities and further handle means mounted on said device, said cover members having a substantially flat outer wall for supporting and insulating said articles when removed from said cavities.

2. A combination receptacle and coaster device comprising a main body portion having a longitudinal axis and a plurality of cavities symmetrically disposed on each side of said axis, a cover member removably positioned on each of said cavities for sealing said cavities, said cover member having depending side walls in close proximity to said main body portion and terminating adjacent a bottom wall, a ridge portion mounted on each of said cover members for removing said cover member from said cavities, said cover members having a substantially flat outer wall for supporting said side walls substantially upright when removed from said cavities a handle slidably mounted on said receptacle on said axis and means mounted on said handle for limiting the outward sliding movement of said handle beyond a predetermined position.

3. A combination receptacle and coaster device comprising a main body portion having a longitudinal axis and a plurality of cavities symmetrically disposed on each side of said axis, each of said cavities having cylindrical side walls and an outwardly flared seat portion at the top of said side walls, a coaster device removably mounted on each of said cavities, said coaster device having a cover portion and depending side walls in close proximity to said side walls of said cavities, said cover portion having an outwardly flaring peripheral portion in contact relation with said seat portion for sealing said cavities, a ridge portion mounted on said cover for handling said coaster device, said cover having a substantially flat outer wall for supporting said coaster device when removed from said receptacle, a pair of bores extending through said receptacle along said longitudinal axis, a U-shaped handle having a pair of leg portions slidably received by said bores and shoulder means mounted in said bores and cooperating with said leg portions limiting the sliding movement of said handle beyond a predetermined outward position.

4. A combination receptacle and coaster device comprising a main body portion having a longitudinal axis and a plurality of cavities symmetrically disposed on each side of said axis, each of said cavities having cylindrical side walls and an outwardly flared seat portion at the top of said side walls, a coaster device removably mounted on each of said cavities, said coaster device having a cover portion and depending side walls in close proximity to said side walls of said cavities, said cover portion having an outwardly flaring peripheral portion in contact relation with said seat portion for sealing said cavities, a ridge portion mounted on said cover for handling said coaster device said cover having a substantially flat outer wall for supporting said coaster device when removed from said receptacle, a pair of bores extending through said receptacle along said longitudinal axis, a U-shaped handle having a pair of leg portions slidably received by said bores, each of said bores having a shoulder intermediate their ends, a disk mounted on the ends of said leg portions of said handle for limiting the outward movement of said handle beyond a predetermined position, said receptacle having a slot along said longitudinal axis for receiving said handle and a pair of transverse slots below said handle to permit grasping said handle when lying in said first named slot.

References Cited in the file of this patent

UNITED STATES PATENTS

| | | |
|---|---|---|
| 2,115,654 | Swofford | Apr. 26, 1938 |
| 2,431,713 | Stigler | Dec. 2, 1947 |
| 2,460,915 | Allen | Feb. 8, 1949 |
| 2,593,861 | Eder et al. | Apr. 22, 1952 |
| 2,647,653 | Dube | Aug. 4, 1953 |
| 2,655,282 | Dunbar | Oct. 13, 1953 |